United States Patent
Espinoza et al.

(10) Patent No.: US 6,720,358 B2
(45) Date of Patent: Apr. 13, 2004

(54) WATER STRIPPING AND CATALYST/LIQUID PRODUCT SEPARATION SYSTEM

(75) Inventors: Rafael L. Espinoza, Ponca City, OK (US); Sergio Mohedas, Ponca City, OK (US); Vincent Melquist, Ponca City, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/034,452

(22) Filed: Dec. 28, 2001

(65) Prior Publication Data

US 2003/0125396 A1 Jul. 3, 2003

(51) Int. Cl.⁷ .............................................. C07C 27/00
(52) U.S. Cl. ........................ 518/700; 518/706; 518/728
(58) Field of Search ................................ 518/700, 706, 518/728

(56) References Cited

U.S. PATENT DOCUMENTS

| | | |
|---|---|---|
| 3,432,036 A | 3/1969 | Kaiser |
| 3,807,142 A | 4/1974 | Rich et al. ................ 55/191 |
| 4,605,678 A | 8/1986 | Brennan et al. .......... 518/700 |
| 4,973,453 A | 11/1990 | Agee ....................... 422/190 |
| 5,260,239 A | 11/1993 | Hsia ......................... 502/30 |
| 5,268,344 A | 12/1993 | Pedrick et al. ............ 502/30 |
| 5,288,673 A | 2/1994 | Behrmann et al. ........ 502/30 |
| 5,407,644 A | 4/1995 | Rytter et al. ............. 422/147 |
| 5,422,375 A | 6/1995 | Rytter et al. ............. 518/700 |
| 5,520,890 A | 5/1996 | Lorentzen et al. ....... 422/197 |
| 5,527,473 A | 6/1996 | Ackerman ................ 210/767 |
| 5,565,177 A | 10/1996 | Cetinkaya ................ 422/144 |
| 5,770,629 A | 6/1998 | Degeorge et al. ........ 518/700 |
| 5,811,469 A | 9/1998 | Leviness et al. ......... 518/700 |
| 5,827,903 A | 10/1998 | White et al. ............. 518/710 |
| 5,844,006 A | 12/1998 | Jager et al. .............. 518/700 |
| 5,900,159 A | 5/1999 | Engel et al. .............. 210/788 |
| 5,917,078 A | 6/1999 | Battosta et al. .......... 558/274 |
| 5,962,537 A | 10/1999 | Leviness .................. 518/700 |
| 6,060,524 A | 5/2000 | Casanave et al. ........ 518/706 |
| 6,068,760 A | 5/2000 | Benham et al. .......... 208/950 |
| 6,069,179 A | 5/2000 | Rytter et al. ............. 518/700 |
| 6,156,809 A | 12/2000 | Clark et al. .............. 518/719 |
| 6,225,358 B1 | 5/2001 | Kennedy .................. 518/700 |
| 6,403,660 B1 | 6/2002 | Espinoza et al. ......... 518/700 |

OTHER PUBLICATIONS

Rothaemel, et al, "The effect of water on cobalt Fishcer-Tropsch catalysts studied by steady–state isotopic transient kinetic analysis (SSITKA)", Catalysis Today 38, 79–84, (1997).

D., Schanke, et al, "Reoxidation and Deactivation of Supported Cobalt Fischer–Tropsch Catalysts", Energy & Fuels, vol. 10, No. 4, 867–872, (1996).

A. M. Hilmen, et al, "Study of the effect of water on alumina supported cobalt Fischer–Tropsch catalysts", Applied Catalysis A: General 186, 169–188, (1999).

PCT International Search Report for International Application No. PCT/US02/41012 dated Mar. 9, 2003 (2 p).

*Primary Examiner*—J. Parsa
(74) *Attorney, Agent, or Firm*—Conley Rose, P. C.

(57) ABSTRACT

The present invention relates to a method and system for water removal and optionally liquid product separation in slurry reactors operating at Fischer-Tropsch conditions. More particularly, the present invention includes a water stripping system that allows the reaction water to the stripped in an external vessel, with a relatively high rate of catalyst and wax circulation. In a preferred embodiment of the present invention, a method for removing water from a slurry reactor containing a water-rich slurry includes removing a portion of water-rich slurry from the slurry reactor, stripping water from the water-rich slurry using a dry gas to form a water-reduced slurry and a water-rich gas stream, and returning the water-reduced slurry back to the reactor.

30 Claims, 3 Drawing Sheets

WATER STRIPPING AND CATALYST/LIQUID PRODUCT SEPARATION SYSTEM

CROSS-REFERENCE TO RELATED APPLICATIONS

This application is related to concurrently filed, commonly assigned, co-pending U.S. Provisional applications Ser. No. 10/320,311, entitled "Water Removal in Fischer-Tropsch Processes," and Ser. No. 10/315,371, entitled "Method For Reducing Water Concentration In A Multi-Phase Column Reactor," both hereby incorporated herein by reference.

STATEMENT REGARDING FEDERALLY SPONSORED RESEARCH OR DEVELOPMENT

Not applicable.

FIELD OF THE INVENTION

The present invention relates to a method and apparatus for the preparation of hydrocarbons from synthesis gas, i.e., a mixture of carbon monoxide and hydrogen, typically labeled the Fischer-Tropsch process. Particularly, this invention relates to a method and apparatus for in situ water removal in multi-phase column reactors operating at Fischer-Tropsch conditions.

BACKGROUND OF THE INVENTION

Large quantities of methane, the main component of natural gas, are available in many areas of the world, and natural gas is predicted to outlast oil reserves by a significant margin. However, most natural gas is situated in areas that are geographically remote from population and industrial centers. The costs of compression, transportation, and storage make its use economically unattractive. To improve the economics of natural gas use, much research has focused on the use of methane as a starting material for the production of higher hydrocarbons and hydrocarbon liquids, which are more easily transported and thus more economical. The conversion of methane to hydrocarbons is typically carried out in two steps. In the first step, methane is converted into a mixture of carbon monoxide and hydrogen (i.e., synthesis gas or syngas). In a second step, the syngas is converted into useful hydrocarbons.

This second step, the preparation of hydrocarbons from synthesis gas, is well known in the art and is usually referred to as Fischer-Tropsch synthesis, the Fischer-Tropsch process, or Fischer-Tropsch reaction(s). Fischer-Tropsch synthesis generally entails contacting a stream of synthesis gas with a catalyst under temperature and pressure conditions that allow the synthesis gas to react and form hydrocarbons.

More specifically, the Fischer-Tropsch reaction is the catalytic hydrogenation of carbon monoxide to produce any of a variety of hydrocarbon products ranging from methane to higher alkanes. Research continues on the development of more efficient Fischer-Tropsch catalyst systems and reaction systems that increase the selectivity for high-value hydrocarbons in the Fischer-Tropsch product stream.

There are continuing efforts to design reactors that are more effective at producing these desired products. Product distribution, product selectivity, and reactor productivity depend heavily on the type and structure of the catalyst and on the reactor type and operating conditions. Catalysts for use in such synthesis usually contain a catalytically active metal of Groups 8, 9, or 10 (in the New notation of the periodic table of the elements, which is followed throughout). In particular, iron, cobalt, nickel, and ruthenium have been abundantly used as the catalytically active metals.

Originally, the Fischer-Tropsch synthesis was operated in packed bed reactors. These reactors have several drawbacks, such as temperature control, that can be overcome by gas-agitated slurry reactors or slurry bubble column reactors. Gas-agitated reactors, sometimes called "slurry reactors" or "slurry bubble columns," operate by suspending catalytic particles in liquid and feeding gas reactants into the bottom of the reactor through a gas distributor, which produces small gas bubbles. As the gas bubbles rise through the reactor, the reactants are absorbed into the liquid and diffuse to the catalyst where, depending on the catalyst system, they are converted to gaseous and/or liquid products. The gaseous products enter the gas bubbles and are collected at the top of the reactor. Liquid products are recovered from the suspending liquid using different methods, for example, by passing the slurry through a filter that separates the liquid from the catalyst solids, and then separating the liquids.

A known problem in slurry reactors, however, is that water is continuously formed during Fisher-Tropsch synthesis in the reactors. This is known to limit conversion and prematurely deactivate catalyst systems such as iron and cobalt-based Fisher-Tropsch catalysts through an oxidation mechanism. As is well known in the art, a high water partial pressure correlates to a high deactivation rate. This is detrimental to the overall system performance, since two requirements for a successful commercial application of cobalt-based Fischer-Tropsch catalysts are a stable performance (low deactivation rate) and, for middle distillates production, a high wax selectivity (or a high alpha value).

For any given cobalt-based catalyst, along with the H2/CO ratio and the reaction temperature, the total pressure is a parameter that has a direct influence on the wax selectivity, in that a higher pressure will result in a higher wax selectivity. However, a higher total pressure (at any given degree of per-pass conversion) also correlates to a higher water partial pressure and therefore a higher deactivation rate. Therefore, if reactors are operated at conditions conducive to higher alpha values (higher pressures), per-pass conversion will necessarily have to be low to avoid premature catalyst deactivation due to water. A low per-pass conversion is undesirable, however, because it results in higher capital investment and operating costs. Additionally, for iron-based catalysts, the water not only has a negative effect on the catalyst deactivation rate, but it also inhibits the rate of reaction.

The water partial pressure is therefore a constraint that will not allow the realization of the kinetic and/or wax selectivity potential of iron and cobalt-based Fisher-Tropsch catalysts. Therefore, in order to improve the efficiency of slurry reactors using iron and cobalt-based catalyst systems, there exists a need for a method to remove water formed during Fisher-Tropsch synthesis.

SUMMARY OF THE INVENTION

The present invention relates to a system and method for water removal and optional liquid product separation in slurry reactor systems operating at Fischer-Tropsch conditions. More particularly, the present invention includes a water stripping system that allows the reaction water to be stripped and heavy liquid products to be removed in an external vessel. The term "heavy liquid" products is herein defined as hydrocarbons in the wax range, that is hydrocarbons heavier than Carbon 19. Generally, in stripping, a liquid containing a dissolved liquid or gas, such as water, flows down a column while a stripping gas flows up the column at conditions such that the dissolved liquid or gas comes out of solution and is carried off with the stripping gas. In the present invention this system can remove water dissolved in the wax, and potentially water contained in the very small bubbles in the wax, therefore allowing a higher per-pass conversion at pressures conducive to high alpha values while protecting the catalyst from excessive oxidation. By allowing a higher pass per conversion, fewer stages may be necessary to achieve a suitable overall conversion.

In a preferred embodiment of the present invention, a method for removing water from a slurry reactor containing a water-rich slurry includes removing a portion of water-rich slurry from the slurry reactor, stripping water from the water-rich slurry using an dry gas to form a water-reduced slurry and a water-rich gas stream, and returning the water-reduced slurry back to the reactor. Generally, the slurry includes gaseous reactants and products, liquid hydrocarbon products ranging from light liquid products to heavy liquid products, and catalyst. In some embodiments, a fraction of the heavy liquid products may be separated from the remaining slurry prior to returning the slurry back to the reactor.

In another preferred embodiment of the present invention, a method for producing hydrocarbons includes contacting a synthesis gas with a hydrocarbon synthesis catalyst in a slurry body comprising the catalyst and gas bubbles in a hydrocarbon slurry liquid having light and heavy components, under reaction conditions effective to form hydrocarbons and unavoidable secondary products, such as water, from the synthesis gas. A portion of the slurry from the slurry body then passes into a gas-disengaging zone to separate gas bubbles from the slurry and form gas-reduced slurry. Next, the gas-reduced slurry passes into a stripping zone, wherein the gas-reduced slurry is contacted with a dry stripping gas, which at least partially removes water therein to form water-reduced slurry. Lastly, the water reduced slurry passes back into the slurry body. In some embodiments, a fraction of the liquid component of the hydrocarbon slurry is separated from the remaining slurry prior to passing the slurry back into the slurry body.

The present invention allows higher per-pass conversions of syngas and/or use of higher total pressures at any given degree of conversion, while protecting the Fischer-Tropsch catalyst from an excessive oxidation rate. By returning the water-reduced slurry back into the reactor and optionally removing a fraction of the heavy liquid products, the catalyst inventory in the reactor is kept approximately constant. In some instances, circulation of the liquid back to the reactor may improve the temperature profile in the reactor.

BRIEF DESCRIPTION OF THE FIGURES

A better understanding of the present invention can be obtained when the following detailed description of the preferred embodiment is considered in conjunction with the following drawings.

DETAILED DESCRIPTION OF THE PREFERRED EMBODIMENTS

Where natural gas of suitable quantity and quality is available, gas stripping may be employed to extract undesirable components, such as water, from a Fischer-Tropsch system. In a preferred embodiment of the present invention, a stream of dry gas is introduced in countercurrent flow to the water/wax/hydrocarbon slurry. In some embodiments, hydrogen is the preferred stripping gas. Introduction of the stripping gas to the slurry reduces the water partial pressure in the mixture, creating a drive force for mass transfer from the liquid to the gas phase.

Process

Figure 1:
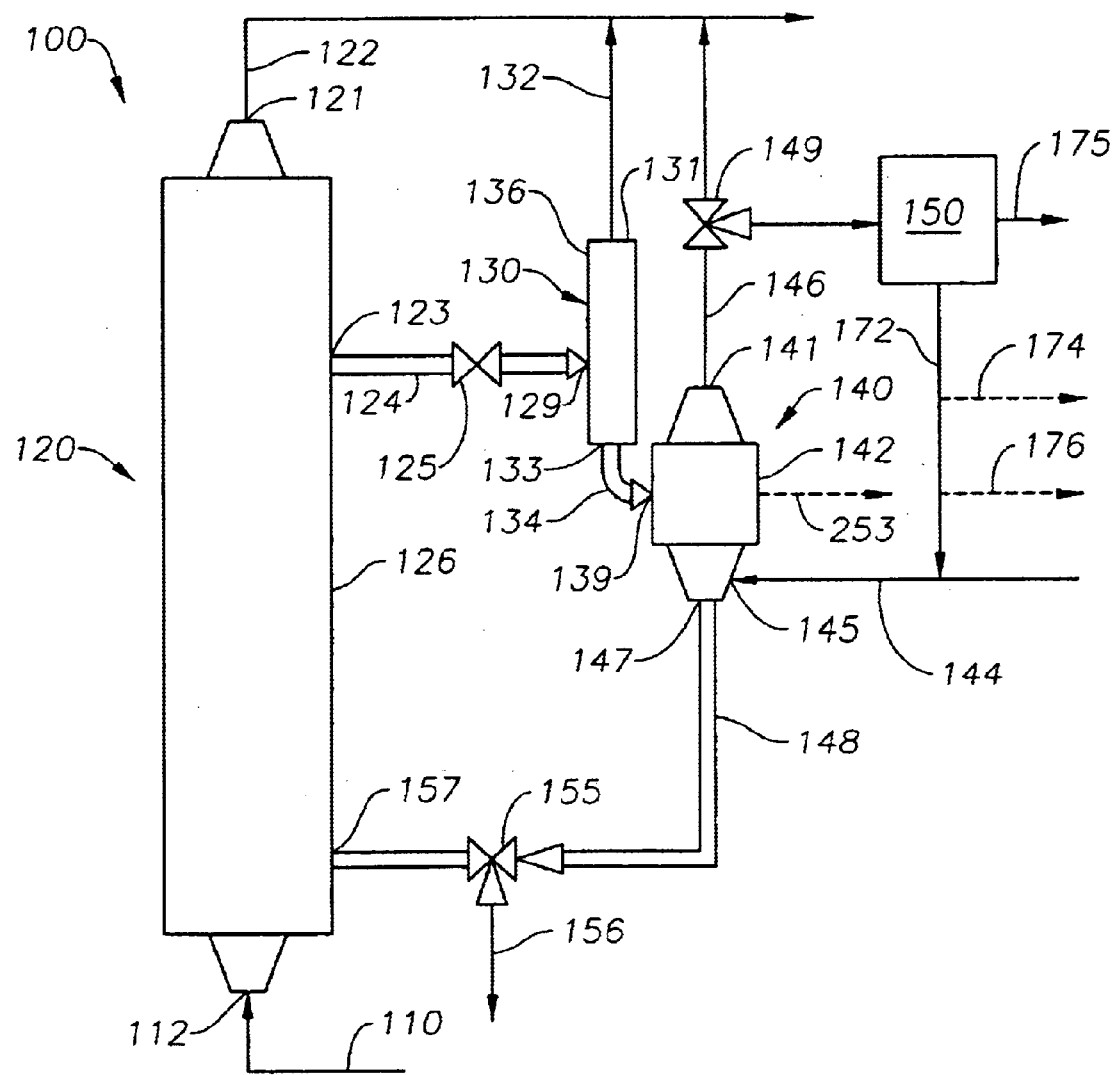
FIG. 1 is a schematic diagram of a Fischer-Tropsch reactor system including a gas-stripping unit in accordance with a preferred embodiment of the present invention.

Referring now to FIG. 1, a system 100 in accordance with a preferred embodiment of the present invention includes slurry reactor 120, a de-gasser 130, and a water stripping system 140. Reactor 120 includes a tank 126, a catalyst system (not shown), inlets 112 and 157, and outlets 121, and 123. De-gasser 130 preferably includes a tank 136, optional baffle plates (not shown), an inlet 129, and outlets 131 and 133. Water stripping system 140 includes a vessel 142, inlets 139 and 145, and outlets 141 and 147. If included, the baffle plates are preferably not heated. The interrelationship and separation of these components are discussed in detail below.

Slurry Reactor

As described earlier, slurry reactors operate by suspending catalytic particles in liquid by feeding gas reactants in line 110 into the bottom of reactor 120 through inlet 112, which produces gas bubbles (not shown). As the gas bubbles rise through the reactor, the reactants are absorbed into the liquid and diffuse to the catalyst where, depending on the catalyst system, they are converted to gaseous and liquid products. The gaseous products enter the gas bubbles and exit at the top of reactor 120 through outlet 121 into line 122. Liquid products 124 leave reactor 120 as a water-rich slurry via outlet 123 and enter de-gasser 130 at inlet 129. A valve 125 in line 124 regulates the flow of slurry to de-gasser 130. Outlet 123 is preferably positioned near the top of the slurry bed. It is known to operate slurry bed Fischer Tropsch reactors in a variety of ways, including but not limited to: plug flow of gas through the catalyst bed and well-mixed or back-mixed gas flow.

De-Gasser

De-gasser 130 may include any suitable de-gassing equipment. For example, when liquid droplets are entrained in a gas, separation is enhanced by allowing the liquid drops to hit and adhere to a solid surface, such as a baffle plate. Similarly, when a gas is dissolved in a liquid, separation may be enhanced by inducing the gaseous constituent to assume the vapor phase. Inducing the gaseous constituent to assume the vapor phase requires disturbing the equilibrium between the gas and the liquid. This may be done by heating the liquid, thus lowering the solubility of the gas, by passing a second gas through the liquid so as to sweep out the dissolved gas, or by lowering the pressure above the liquid. Various other de-gassing techniques are known in the art and can be used in the present system. In one preferred embodiment of the present invention, de-gasser 130 includes simply a baffle plate.

As the slurry enters de-gasser 130, it flows downward and is optionally guided by baffle plates (not shown). A portion of the gas dissolved in the slurry flows upward, forming a gas stream, which exits the top of de-gasser 130 into line 132 and a degassed water-rich slurry, which exits the bottom of de-gasser 130 into line 134. The gas stream 132 exits de-gasser 130 through outlet 131 at the top of de-gasser 130. The gas stream 132 may optionally be combined with gaseous products stream 122, as shown. Degassed water-rich slurry line 134 exits de-gasser 130 via outlet 133 at the bottom of de-gasser 130 and enters water-stripping system 140 at inlet 139. The stream leaving de-gasser 130 via line 134 is preferably essentially free of gas bubbles and contains essentially all of the liquid and solids leaving reactor 120.

Stripping and Separation System

Figure 2:
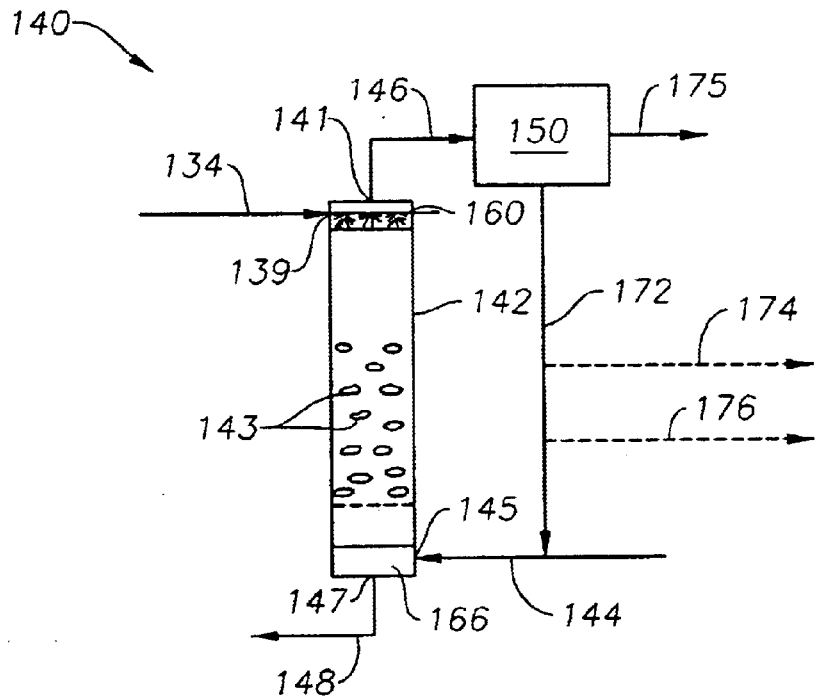
FIG. 2 is a schematic diagram of a first gas stripping system in accordance with one embodiment of the present invention.

The slurry containing the liquids and solids flow from de-gasser 130 into striping system 140, wherein it is stripped of water. A first embodiment of a stripping system 140 is illustrated in detail in FIG. 2. System 140 preferably includes a cylindrical column, or tower, 142 equipped with a gas inlet 145 and a distribution chamber 166 at the bottom; a liquid inlet 139 and an optional distributor 160 at the top; and liquid and gas outlets 147 and 141 at the bottom and top, respectively. The inlet liquid in line 134, which contains the water-rich slurry, is distributed into vessel 142 by distributor 160. A dry stripping gas, such as hydrogen, methane, nitrogen, carbon or any combination of them, enters distribution chamber 166 at the bottom of vessel 142 and flows upward, countercurrent to the flow of the liquid. The dry stripping gas does not have to be 100% pure and it may contain small amounts of other gases, for instance, carbon monoxide, carbon dioxide, light hydrocarbons, etc. In some embodiments, the gas is sparged into vessel 142, increasing the area of contact between the liquid and gas, and encouraging intimate contact between the phases. Contact between phases can also be improved by placing packing elements 143, or metal tubes, rods, or screens (not shown) inside vessel 142 so as to slow the flow of the gas bubbles upward through the slurry. If packing elements 143 are used, it is preferred to provide a supporting grid (shown in phantom) beneath packing elements 143, so as to prevent them from settling on the bottom of vessel 142.

The water in the slurry is stripped by the dry gas entering the vessel, and water-rich gas leaves the top of the tower through outlet 141 into line 146. The water content in the slurry decreases as the slurry flows downward in vessel 142, so that the slurry leaving the bottom of vessel 142 through liquid outlet 147 is essentially water-free. The water-free slurry in line 148 can be exported via line 156.

Referring again to FIG. 1, the de-watered slurry mixture 148 is more preferably recycled into reactor 120 at inlet 157 so that the catalyst is conserved. A valve 155 on line 148 regulates slurry flow to slurry reactor 120. In some embodiments, a portion 156 of slurry mixture 148 may be removed for other uses such as sampling for quality control purposes, etc.

Still referring to FIG. 1, the water-rich vapor phase stream leaving vessel 142 via line 146 comprises the gaseous stripping agent, water, and various amounts of other vaporized products such as unreacted stock from line 110, and part of the gaseous products formed in reactor 120. In some embodiments, system 140 may include a wet gas purifier 150, wherein wet gas stream 146 is separated into components including dry gas and water/light hydrocarbons mixture. A valve 149 may be used to send all or a portion of gaseous stream 146 to wet gas purifier 150 or to be mixed with streams 122 and/or 132. Dry gas from wet gas purifier 150 may then be recycled via line 172 back into vessel 142 via feed line 144. Optionally, either wet gas stream 146 or dry gas stream 172 may be combined with outlet streams 122 and/or 132. Also optionally, part or all of the dry gas in stream 172 may be sent to a further purification section (not shown) via line 174 or may be purged from the system via line 176.

In wet gas purifier 150, at least a portion of the gas stream in line 146 is condensed so that two phases are formed, namely a stripping agent rich phase and a water-rich phase. The stripping agent rich phase is preferably returned to stripper 140. Subsequent processing of the water-rich phase may be performed by processes known in the art to recover the material and render the water suitable for disposal.

Figure 3:
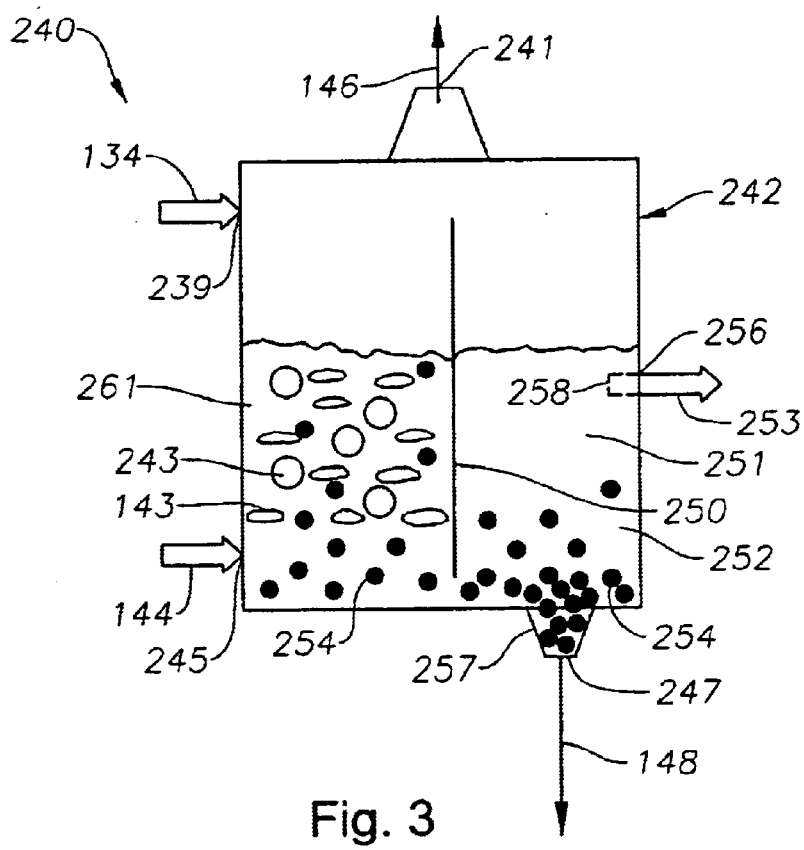
FIG. 3 is a schematic diagram of a gas stripping and settling system in accordance with a preferred embodiment of the present invention.

In some embodiments, in addition to stripping out the water, it may be desirable to separate a fraction of the liquid products from the catalyst prior to recycling the de-watered slurry. A stripping and settling system 240 that is suitable for this dual purpose is illustrated in FIG. 3. System 240 is an alternative to system 140, inasmuch as it includes a stripping vessel 242 equipped with a gas inlet 245, a slurry inlet 239, slurry and gas outlets 247 and 241 at the bottom and top, respectively. System 240 further includes a liquid outlet 253 intermediate between the top and bottom of vessel 242. System 240 preferably also includes at least one internal baffle plate 250 and may optionally include a slurry distributor (not shown) and a gas distribution chamber (not shown). Baffle plate 250 defines a sparging zone 261 on one side thereof and a quiescent zone 251 on the other side thereof.

The water-rich slurry containing catalyst particles, hydrocarbon liquids and water enters the top of vessel 242 via line 134. As in the embodiment of FIG. 2, a dry stripping gas enters the bottom of vessel 242 from line 144 and flows upward through the slurry. The dry stripping gas does not have to be 100% pure and it may contain small amounts of other gases, for instance, carbon monoxide, carbon dioxide, light hydrocarbons, etc. Preferably, the gas is sparged into vessel 242, forming bubbles 243. The water in the liquid is removed by the stripping gas, and water-rich stripping gas leaves the top of the vessel through outlet 241.

Because the catalyst particles are much denser than the liquids in the slurry, they begin settling as soon as the slurry enters the vessel. In sparging zone 261, however, rising gas bubbles 243 tend to prevent complete settling of the particles. Hence, in this embodiment, baffle plate 250 is preferably provided so as to define a quiescent zone 251 that is essentially free of rising gas bubbles and in which the hydrocarbon liquids 252 can be separated from the catalyst particles 254 using the density difference between the catalyst particles 254 and the liquid product 252. In a preferred operation, relatively or essentially water-free slurry flows under baffle plate 250 into quiescent zone 251. Because the catalyst particles 254 are denser than the liquid product 252, they tend to settle to the bottom of vessel 242.

Figure 4:
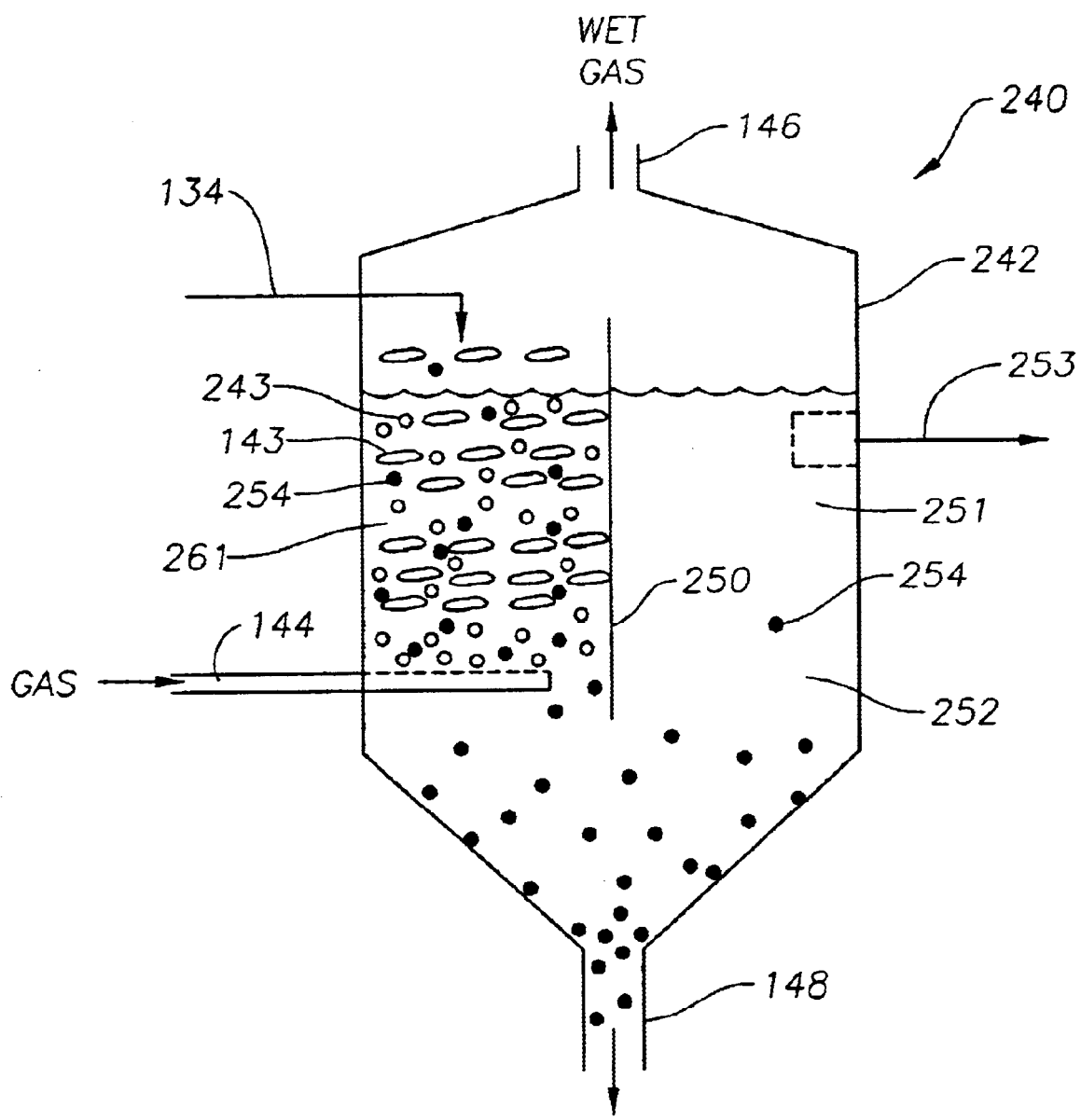
FIG. 4 is a schematic diagram of an alternative gas stripping and settling system in accordance with a preferred embodiment of the present invention.

In a preferred embodiment, vessel 242 is sized such that the residence time of the slurry therein is sufficient to allow most or essentially all of the catalyst particles to settle out of an upper portion of the hydrocarbon liquid. In a further preferred embodiment, the floor of vessel 242 includes a collection area 257 in which further settling of particles 243 can occur. Collection area 257 is optionally positioned under quiescent zone 251. In some instances, it may be preferred to position outlet 247 as far away from sparging zone 261 as possible. In an alternative embodiment shown in FIG. 4, collection area 257 need not be positioned asymmetrically and can be conical or sloped so as to enhance settling and separation of particles 243. The settled catalyst and another portion of the liquid product exit the bottom of vessel 242 via outlet 247 and follow the preferably gravity-driven circulation loop 148 back to reactor 120 (FIG. 1). Sufficient liquid should be removed through outlet 257 to ensure that the catalyst-containing slurry in line 148 is flowable and, if necessary, pumpable.

A second portion of the liquid product, typically comprising catalyst-free or substantially catalyst-free liquid product, can be removed from vessel 242 via outlet 256. Outlet 256 is positioned preferably in quiescent zone 251 and at a sufficient height above the floor of vessel 242 to minimize the possibility that stray particles 254 will pass through it. If desired, a screen 258 may optionally be included at outlet 256, to ensure that no catalyst enters line 253. The amount of liquid withdrawn through line 253 is preferably set such that substantially no solid particles are withdrawn.

Alternative Operation

In some instances, it may be desirable to remove the heavy liquid products from the product prior to recycling the slurry without stripping. In such cases, gas inlet 245 is closed and baffle plate 250 may be optionally removed.

Computer Simulation

The operating conditions (i.e. pressure, temperature) of the stripping system 140, 240 are preferably similar to conditions of the slurry reactor 120 because a circulating loop is established between the two components. Using typical conditions (e.g. T=425° F., P=400 psia), for a nominal liquid flow rate of 10,000 kg/h in the slurry circulation loop (reactor to stripper to reactor) the following stripping streams were simulated using a commercial process simulator. The results are listed in Table 1 below.

TABLE 1

| Stripping Gas | % Water removal from slurry |
| --- | --- |
| Hydrogen | 82 |
| Methane | 80 |
| Nitrogen | 79 |
| Light Hydrocarbons (<$C_{10}$) | <20 |

In each simulation, stripping gases were injected at a rate of 8 kg-mol/h per 10,000 kg/h of slurry flow in the stripping loop. As can be seen, the water stripping performance is better for hydrogen than for methane and nitrogen. However, the effect of the stripping gas downstream also plays a role in determining the most suitable stripping gas, as discussed below.

For a reactor configuration of multiple reactor stages in series, the overhead gas stream of the water stripper may be mixed with the overhead of the reactor, and after cooling and condensing steps, the gas mix is sent to the next reaction stage. In this configuration, wet hydrogen, produced in the water stripper, tends to react in the next stage reactor, while methane and nitrogen act as inert components. This higher inert content in the reactant mixture is detrimental to the economics of the process because of under-utilization of reactor volume and a possible decrease in the Fischer-Tropsch reaction rate. For these reasons, it is preferred to use a hydrogen-rich stream as the stripping gas in the present water stripping system, although other gases may also be used.

While the present invention has been disclosed and described in terms of a preferred embodiment, the invention is not limited to the preferred embodiment. For example, while the present invention has been described with a vessel with internals to favor contact between slurry and the stripping gas, it should be understood that other vessel designs may be used. In addition, various modifications to the operating conditions and stripping gases, among others, can be made without departing from the scope of the invention. In the claims that follow, any recitation of steps is not intended as a requirement that the steps be performed sequentially, or that one step be completed before another step is begun, unless explicitly so stated.

What is claimed is:

1. A method for operating a Fischer-Tropsch reactor, comprising:
    a) contacting a synthesis gas comprising a mixture of hydrogen and carbon monoxide with a hydrocarbon synthesis catalyst in a slurry body comprising the catalyst and gas bubbles in a hydrocarbon slurry liquid, under reaction conditions effective to form hydrocarbons and secondary products including water from the synthesis gas, at least a portion of which are liquid at the reaction conditions, thereby forming a catalyst-containing water-rich slurry;
    b) passing the catalyst-containing water-rich slurry into a stripping zone, wherein the catalyst-containing water-rich slurry is contacted with a stripping gas that at least partially removes water therefrom so as to form a water-reduced slurry; and
    c) passing at least a portion of the water-reduced slurry back into the slurry body.

2. The method according to claim 1, further including the step allowing catalyst particles to settle out of the water-reduced slurry, so as to form a catalyst-containing water-reduced slurry and a catalyst-reduced water-reduced liquid between step (a) and step (c).

3. The method according to claim 2, further including the step of passing the catalyst-containing water-rich slurry through a degasser between step (a) and step (c).

4. A method for producing hydrocarbons from synthesis gas, comprising:
    a) contacting the synthesis gas with a hydrocarbon synthesis catalyst in a slurry body comprising the catalyst and gas bubbles in a hydrocarbon slurry liquid, under reaction conditions effective to form hydrocarbons and secondary products including water from the synthesis gas, at least a portion of which are liquid at the reaction conditions, thereby forming a catalyst-containing water-rich slurry;
    b) passing the catalyst-containing water-rich slurry into a stripping zone, wherein the catalyst-containing water-rich slurry is contacted with a stripping gas that at least partially removes water therefrom so as to form a water-reduced slurry; and
    c) passing at least a portion of the water-reduced starry back into the slurry body.

5. The method according to claim 4, further including the step of allowing catalyst panties to settle out of the water-reduced slurry, so as to form a catalyst-containing water-reduced slurry and a catalyst-reduced water-reduced liquid between step (a) and step (c).

6. The method according to claim 5 wherein step (b) is accomplished by injecting the stripping gas into the bottom of the catalyst-containing water-rich slurry and said settling occurs in a quiescent zone that is essentially free of injected gas bubbles.

7. The method according to claim 2, wherein said stripping zone includes a quiescent zone in which the catalyst particles settle out of the water-reduced slurry.

8. The method according to claim 7, therein said quiescent zone is sized to allow a desired degree of settling.

9. The method according to claim 2, wherein the water-reduced slurry of step (c) comprises the catalyst-containing water-reduced slurry.

10. The method according to claim 2, wherein said stripping zone further includes a collection area in which said catalyst particles settle and collect.

11. The method according to claim 1, wherein step b) further produces a water-rich gas stream, and wherein said water-rich gas stream is separated in a separation zone to form a dry gas phase and a water phase.

12. The method according to claim 11, wherein the separation zone employs condensation.

13. The method according to claim 11, further comprising returning at least a portion of the dry gas phase to the stripping zone.

14. The method according to claim 1, wherein at least 60% of the water in the catalyst-containing water-rich slurry is removed.

15. The method according to claim 1, wherein at least 80% of the water in the catalyst-containing water-rich slurry is removed.

16. The method according to claim 1, wherein the stripping gas comprises at least one of hydrogen, methane, nitrogen and carbon.

17. The method according to claim 16, wherein the stripping gas further comprises at least one of carbon monoxide, carbon dioxide and light hydrocarbons.

18. The method according to claim 1, wherein the stripping gas comprises a hydrogen-rich stream.

19. The method according to claim 5, wherein said stripping zone includes a quiescent zone in which the catalyst particles settle out of the water-reduced slurry.

20. The method according to claim 19, wherein said quiescent zone is sized to allow a desired degree of settling.

21. The method according to claim 5, wherein the water-reduced slurry of step (c) comprises the catalyst-containing water-reduced slurry.

22. The method according to claim 5, wherein said stripping zone further includes a collection area in which said catalyst particles settle and collect.

23. The method according to claim 4, wherein step b) further produces a water-rich gas stream, and wherein said water-rich gas stream is separated in a separation zone to form a dry gas phase and a water phase.

24. The method according to claim 23, wherein the separation zone employs condensation.

25. The method according to claim 23, further comprising returning at least a portion of the dry gas phase to the stripping zone.

26. The method according to claim 4, wherein at least 60% of the water in the catalyst-containing water-rich slurry is removed.

27. The method according to claim 4, wherein at least 80% of the water in the catalyst-containing water-rich slurry is removed.

28. The method according to claim 4, wherein the stripping gas comprises at least one of hydrogen, methane, nitrogen and carbon.

29. The method according to claim 28, wherein the stripping gas further comprises at least one of carbon monoxide, carbon dioxide and light hydrocarbons.

30. The method according to claim 4, wherein the stripping gas comprises a hydrogen-rich stream.

* * * * *

UNITED STATES PATENT AND TRADEMARK OFFICE
CERTIFICATE OF CORRECTION

PATENT NO. : 6,720,358 B2
DATED : April 13, 2004
INVENTOR(S) : Rafael L. Espinoza et al.

It is certified that error appears in the above-identified patent and that said Letters Patent is hereby corrected as shown below:

<u>Column 8,</u>
Line 48, "starry" should be -- slurry --.
Line 51, "panties" should be -- particles --.

Signed and Sealed this

Thirteenth Day of July, 2004

JON W. DUDAS
*Acting Director of the United States Patent and Trademark Office*